（12） United States Patent
Matsumoto et al.

(10) Patent No.: US 6,389,094 B1
(45) Date of Patent: *May 14, 2002

(54) INTEGRAL FORGED SHROUD FLANGE FOR A BOILING WATER REACTOR

(75) Inventors: Jack T. Matsumoto, Sunnyvale; Alex B. Fife, San Jose, both of CA (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,905

(22) Filed: Feb. 2, 1998

Related U.S. Application Data

(60) Provisional application No. 60/057,062, filed on Aug. 29, 1997.

(51) Int. Cl.[7] ............................. G21C 19/02; G21C 5/10
(52) U.S. Cl. ...................... 376/294; 376/260; 376/287; 376/293; 376/302; 376/461
(58) Field of Search .................. 376/260, 287, 376/293, 294, 302, 461

(56) References Cited

U.S. PATENT DOCUMENTS 4,409,179 A * 10/1983 Burger ....................... 376/302
5,623,526 A * 4/1997 Wivagg ..................... 376/302
5,737,378 A * 4/1998 Ballas et al. ................ 376/287

FOREIGN PATENT DOCUMENTS

| DE | 2642352 | * | 3/1978 | |
|---|---|---|---|---|
| JP | 8-233971 | * | 9/1996 | ............... 376/302 |
| JP | 08-278390 | * | 10/1996 | ............... 376/302 |
| JP | 8-278390 | * | 10/1996 | ............... 376/302 |

OTHER PUBLICATIONS

Webster, Noah; Webster's New International Dictionary, Second Edition, p. 2900, 1950.*

* cited by examiner

*Primary Examiner*—Michael J. Carone
*Assistant Examiner*—Jack Keith
(74) *Attorney, Agent, or Firm*—Armstrong Teasdale LLP

(57) ABSTRACT

A forged upper shroud section which may be machined from a single piece rectangular cross-section ring forging and includes a circular flange and a cylindrical shell is described. Openings and slots are machined into the flange to align and support the shroud head. A groove is machined along an inside surface of the cylinder section, and the groove may be used to support top guide grid (not shown). An end of the cylinder section is machined with a weld prep for attachment to the core section of the shroud.

14 Claims, 2 Drawing Sheets

INTEGRAL FORGED SHROUD FLANGE FOR A BOILING WATER REACTOR

CROSS REFERENCE TO RELATED APPLICATION

This application claims the benefit of U.S. Provisional Application No. 60/057,062, filed Aug. 29, 1997.

FIELD OF THE INVENTION

This invention relates generally to boiling water reactors and more particularly, to a forged upper shroud section for a shroud of such a reactor.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide, sometimes referred to as a grid, typically is spaced above a core plate within the RPV. A core shroud, or shroud, typically surrounds the core plate and is supported by a shroud support structure. Particularly, the shroud has a generally cylindrical shape and surrounds both the core plate and the top guide. The top guide includes several openings, and fuel bundles are inserted through the openings and are supported by the core plate.

The shroud, due to its large size, is formed by welding a plurality of stainless steel cylindrical sections together. Specifically, respective ends of adjacent shroud sections are joined with a circumferential weld. A typical arrangement for the upper shroud section is a welded assembly composed of a top guide grid, a shroud flange and a cylinder section. The grid is a mesh of plates located at a lower end of the upper shroud section and typically is fabricated by welding plates to a cylindrical rim. The grid provides horizontal support for the fuel assemblies.

The cylinder of the upper shroud section typically is fabricated from formed and welded plates. The cylinder provides a barrier to separate the upward flow through the separator from the downward flow in the annulus between the shroud and the reactor pressure vessel, provides structural support between the grid and shroud flange, and creates a space/volume between the top of the fuel and the bottom of the shroud head.

The shroud flange is a circular flange located on the top of the upper shroud section. The flange typically is fabricated from several plate sections which are joined by welding. The flange provides a surface/structure to which the shroud head may be bolted, provides structural support of the shroud head, and provides a sealing surface between the shroud and shroud head to limit steam from exiting the shroud.

In more recent known configurations, grids are fabricated from single piece or two piece forgings. The shroud flange and cylinder, however, continue to be fabricated using welded plates or forgings. The use of forgings has decreased the number of welds, but several welds remain in the upper shroud section.

The shroud welds, however, increase the susceptibility of the shroud material to a detrimental effect known as intergranular stress corrosion cracking (IGSCC). Typically, cracking may occur in the heat affected zone of the shroud welds. Eliminating welds in the upper shroud section would eliminate the potential of cracks initiating in welds.

SUMMARY OF THE INVENTION

These and other objects may be attained by a forged upper shroud section which may be machined from a single piece rectangular cross-section ring forging and includes a circular flange and a cylindrical shell. Openings and slots are machined into the flange to align and support the shroud head. A groove is machined along an inside surface of the cylinder section, and the groove may be used to support top guide grid (not shown). An end of the cylinder section is machined with a weld prep for attachment to the core section of the shroud.

The above described upper shroud section is fabricated from a single piece forging and therefore, fewer welds are required with such upper shroud section as compared to known upper shroud section. In addition, the present upper shroud section provides the same flow barrier as the welded upper sections, provides a flange to which the shroud head may be bolted and supported, provides a groove to which the top guide grid may be attached without the need for a ledge or flange, and the number to total shroud welds is reduced because of the single piece design. Reducing the number of welds minimizes cracking which can occur in shroud welds and also reduces the number of welds which must be inspected during the construction and life of the shroud.

DETAILED DESCRIPTION

Figure 1:
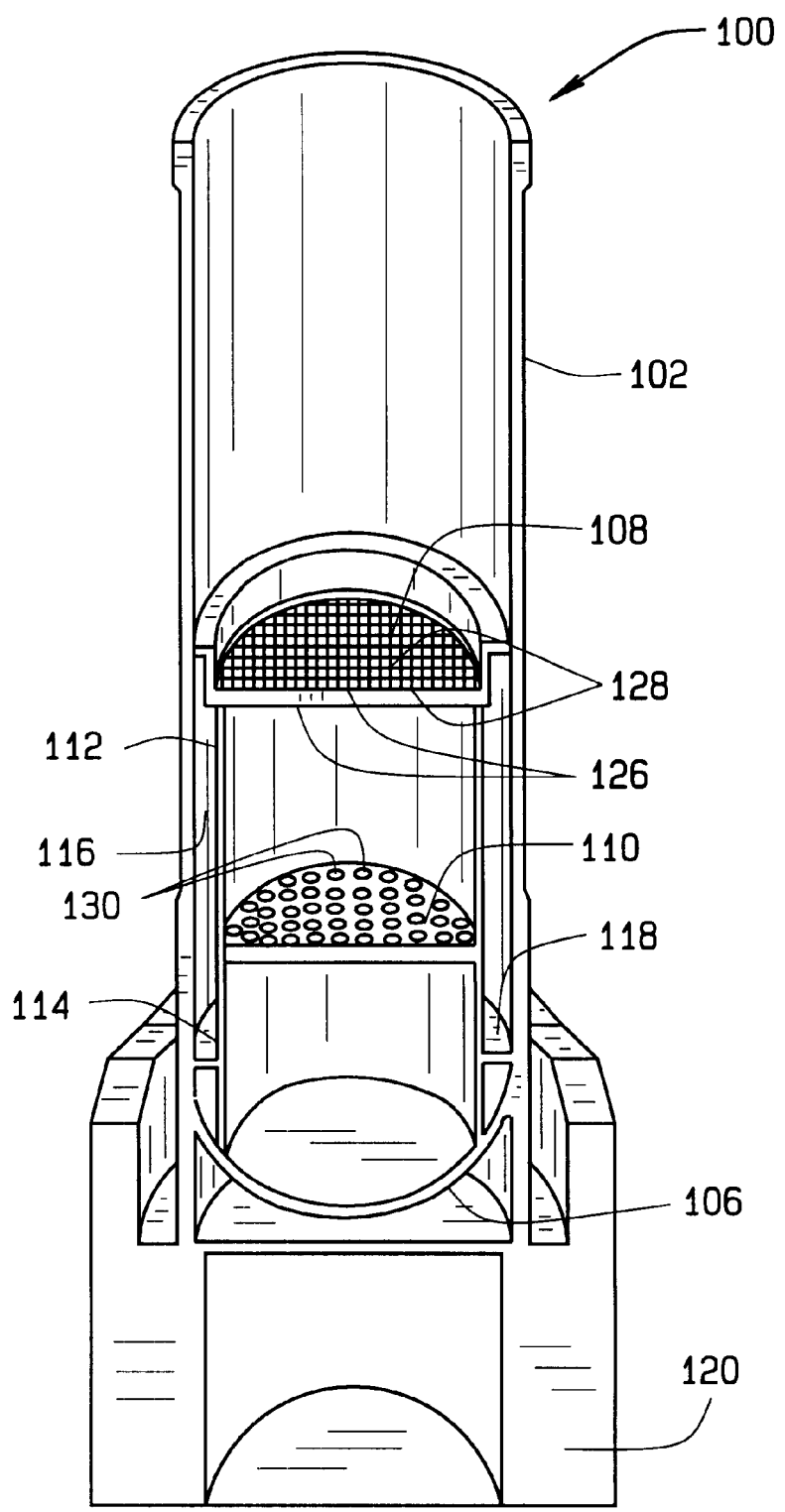
FIG. 1 is a schematic, partial cross section, illustration of a boiling water reactor.

FIG. 1 is a schematic, partial cross section, illustration of a boiling water reactor 100 including a reactor pressure vessel (RPV) 102. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102. RPV 102, of course, is filled with water.

RPV 102 is shown in FIG. 1 as being shut down with many components removed. For example, and in operation, many fuel bundles and control rods (not shown) are located in the area between top guide 108 and core plate 110. In addition, and in operation, steam separators and dryers and many other components (not shown) are located in the area above top guide 108.

Top guide 108 is a latticed structure including several top guide beams 126 defining top guide openings 128. Core plate 110 includes several recessed surfaces 130 which are substantially aligned with top guide openings 128 to facilitate positioning the fuel bundles between top guide 108 and core plate 110. Fuel bundles are inserted into the area between top guide 108 and core plate 110 by utilizing top guide openings 128 and recessed surfaces 130. Particularly, each fuel bundle is inserted through a top guide opening 128, and is supported horizontally by core plate 110 and top guide beams 126. The fuel is supported vertically at the core plate by structure not shown.

Figure 2:
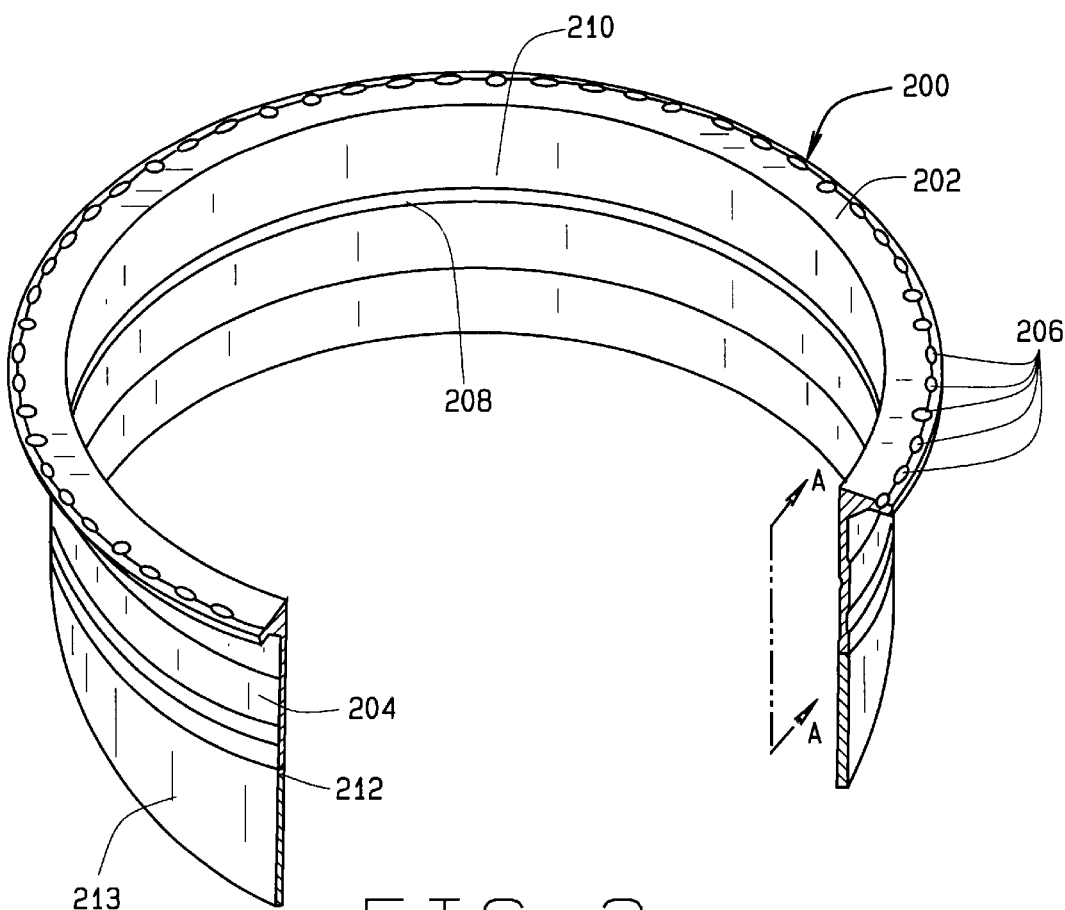
FIG. 2 is a perspective view of a forged upper shroud section, with a portion cut away, in accordance with one embodiment of the present invention.

FIG. 2 is a perspective view of a forged upper shroud section 200, with a portion cut away, in accordance with one embodiment of the present invention. Upper shroud section 200 may be machined from a single piece rectangular cross-section ring forging and includes a circular flange 202 and a cylindrical shell 204. Openings and slots 206 are machined into flange 202 to align and support the shroud head. A groove 208 is machined along an inside surface 210 of cylinder section 200, and groove 208 may be used to support top guide grid (not shown). An end 212 of cylinder section 200 is machined with a weld prep for attachment to the core section of the shroud 213.

Figure 3:
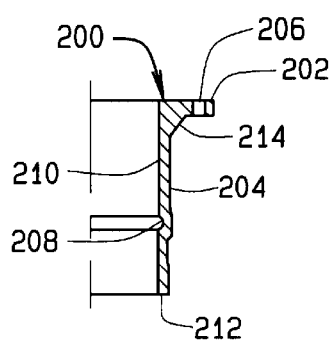
FIG. 3 is a view of the forged upper shroud section through line A—A shown in FIG. 2.

FIG. 3 is a view of forged upper shroud section 200 through line A—A shown in FIG. 2. The thickness of section 200 is governed by the nominal inside diameter of the shroud and the outside diameter of flange 202. The height of section 200 is limited by the size of available ring forgings. The height is also governed by the need to locate the attachment weld of upper shroud section 200 in an area with acceptable fluence levels.

The thickness of flange 202 is selected to provide adequate strength to carry the loads from the shroud head. Flange 202 is also stiffened by the use of an integral gusset 214 which spans between flange 202 and cylinder shell or section 204. The thickness of shroud cylinder section 204 is selected to carry the loads from the shroud head and the radial loads from the top guide grid.

The above described upper shroud section is fabricated from a single piece forging and therefore, fewer welds are required with such upper shroud section as compared to known upper shroud section. In addition, the present upper shroud section provides the same flow barrier as the welded upper sections, provides a flange to which the shroud head may be bolted and supported, provides a groove to which the top guide grid may be attached without the need for a ledge or flange, and the number to total shroud welds is reduced because of the single piece design. Reducing the number of welds minimizes cracking which can occur in shroud welds and also reduces the number of welds which must be inspected during the construction and life of the shroud.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A forged upper shroud section for a shroud of a boiling water nuclear reactor, the shroud comprising at least one cylindrical section, said upper shroud section comprising:
   a cylindrical shell;
   a circular shaped flange at one end of said shell, said flange and said cylindrical shell machined from one forging as one piece;
   at least one of a plurality of openings and a plurality of slots in said flange; and
   a circumferential groove machined into and extending substantially completely around an inside surface of said cylindrical shell.

2. A forged upper shroud section in accordance with claim 1 wherein said cylindrical shell comprises an end configured to be welded to a cylindrical section of the shroud.

3. A forged upper shroud section in accordance with claim 1 wherein a thickness of said flange is selected to carry loads from a shroud head.

4. A forged upper shroud section in accordance with claim 1 further comprising a gusset extending between said flange and cylindrical shell.

5. A forged upper shroud section in accordance with claim 1 wherein a thickness of said cylindrical shell is selected to carry loads from a shroud head and radial loads from a top guide grid.

6. A shroud for a boiling water nuclear reactor, said shroud comprising:
   at least one cylindrical section;
   a forged upper shroud section comprising a cylindrical shell and a circular shaped flange at a first end of said shell, said flange and said cylindrical shell machined from one forging as one piece, a second end of said cylindrical shell welded to one of said at least one cylindrical section;
   at least one of a plurality of openings and a plurality of slots in said flange; and
   a circumferential groove machined into and extending substantially completely around an inside surface of said cylindrical shell.

7. A shroud in accordance with claim 6 wherein a thickness of said flange is selected to carry loads from a shroud head.

8. A shroud in accordance with claim 6 further comprising a gusset extending between said flange and cylindrical shell.

9. A shroud in accordance with claim 6 wherein a thickness of said cylindrical shell is selected to carry loads from a shroud head and radial loads from a top guide grid.

10. A method for fabricating an upper shroud section for a shroud of a boiling water nuclear reactor, the shroud comprising at least one cylindrical section, said method comprising the steps of:
    machining a flange in a single piece rectangular cross-section ring forging;
    machining a cylindrical shell in the forging;
    machining at least one of a plurality of openings and a plurality of slots in the flange; and
    machining a circumferential groove into and extending substantially completely around an inside surface of the cylindrical shell.

11. A method in accordance with claim 10 further comprising the step of preparing an end of the cylindrical shell to be welded to a cylindrical section of the shroud.

12. A method in accordance with claim 10 further comprising the step of selecting a thickness of the flange to carry loads from a shroud head.

13. A method in accordance with claim 10 further comprising the step of machining a gusset extending between the flange and the cylindrical shell.

14. A method in accordance with claim 10 further comprising the step of selecting a thickness of the cylindrical shell to carry loads from a shroud head and radial loads from a top guide grid.

* * * * *